United States Patent Office 3,147,376
Patented Sept. 1, 1964

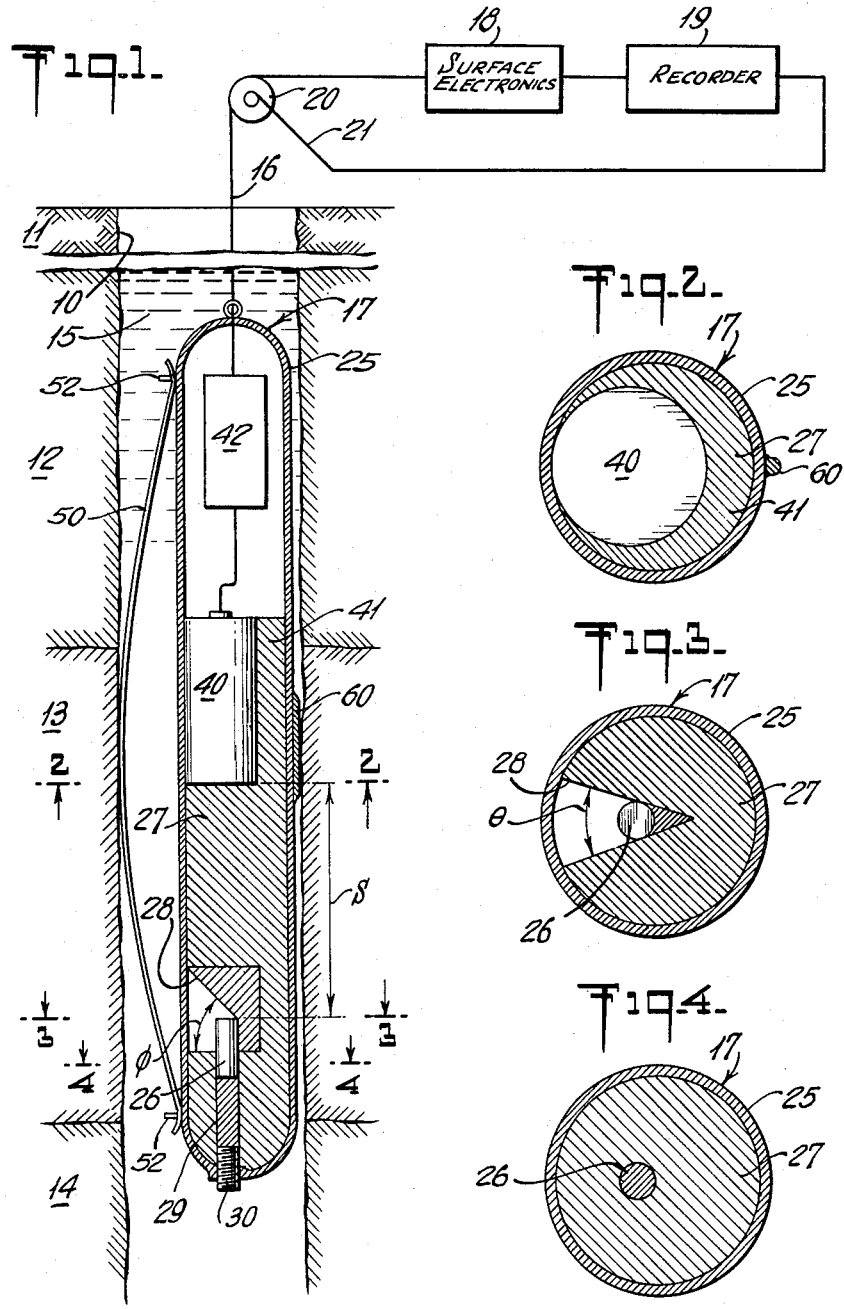

3,147,376
RADIATION CALIPER WELL LOGGING
APPARATUS
Hugh E. Hall, Jr., Houston, Tex., assignor to Texaco Inc., New York, N.Y., a corporation of Delaware
Filed Oct. 14, 1960, Ser. No. 62,693
7 Claims. (Cl. 250—43.5)

The present invention relates generally to radiation well logging, and more particularly it is concerned with the use of penetrative radiation techniques for calipering a borehole traversing a plurality of earth formations.

For various reasons it is often necessary or desirable to have a caliper log of boreholes of the type drilled in the petroleum industry for producing oil. For example, it is often necessary to have such information for correlation purposes along with the usual neutron-gamma radiation well logs employed for determining such information as the porosity of the formations along the borehole. It is also desirable to have a caliper log for correlation with gamma-gamma radiation logs conducted for determining the density of the earth formations.

Conventionally, borehole caliper logs are conducted by means of apparatus employing mechanical probes or feelers in contact with the sides of the borehole for determining variations in the configuration thereof. The caliper information is plotted on a logging record in correlation with the position of the caliper measurement in the borehole.

It has been proposed to conduct borehole caliper measurements simultaneously with neutron-gamma radiation or gamma-gamma radiation well logs. For example, apparatus for carrying out this proposal is disclosed in U.S. Patent 2,761,977, granted September 4, 1956, to Alexander S. McKay. The above-mentioned McKay patent describes the influence of variations in borehole size on both the neutron-gamma and gamma-gamma well logs. The patentee also suggests that the gamma-gamma log, often referred to as a scattered gamma log, can also be used as a caliper measurement of the borehole. However, the patentee does not suggest the use of specific apparatus for such use, other than the usual gamma-gamma radiation formation logging apparatus.

It is a general object of the present invention to provide improvements in penetrative radiation logging instrumentation and methods particularly directed to measurement of the size of the borehole rather than a characteristic of the material of the adjacent earth formations.

It is a more particular object of the present invention to provide improved penetrative radiation caliper methods and apparatus involving neutralization of the influence of the material of the adjacent earth formations on the caliper log.

It is a further object of the present invention to provide apparatus of the character described which is relatively simple to construct and operate.

Briefly stated, the present invention involves improvements in methods and apparatus for conducting a penetrative radiation caliper well log of a borehole traversing earth formations wherein a selected penetrative radiation is emitted in the borehole and resultant scattered radiation is detected and a signal display proportional to the intensity thereof is provided as an indication of the size of the borehole in correlation with the position of the measurement in the borehole. This invention involves neutralization of the influence of variations in the material of the invironment of the borehole, including adjacent earth formations, on the signal indicating the intensity of the aforesaid scattered penetrative radiation. This is accomplished by also emitting in the borehole a predetermined flux of another type of penetrative radiation and detecting the resultant radiation in the borehole and wherein the intensity of the radiation resulting from said other type of penetrative radiation characteristically varies inversely due to variations in material of the borehole environment as compared with variations in the intensity of the scattered selected radiation due to such changes.

A preferred method according to the present invention involves conducting a borehole caliper measurement as a function of the intensity of the scattered gamma radiation in a borehole and wherein the influence of the borehole environmental material upon the scattered gamma radiation intensity is neutralized by simultaneously irradiating the borehole environmental material with neutrons of predetermined flux and detecting the resultant induced gamma radiation along with the scattered gamma radiation so that the variations in the borehole environmental material affecting both the scattered gamma radiation intensity and the neutron-induced gamma radiation intensity will be effectively neutralized in the resultant scattered gamma radiation caliper well log.

Briefly stated, a preferred aspect of the present invention involves the provision of apparatus for conducting a penetrative radiation caliper well log of a borehole comprising an instrument housing suitable to be passed through the borehole for measuring the influence of variations in the size of the borehole on the intensity of a beam of penetrative radiation scattered in the borehole. More particularly, the instrument housing includes a source of gamma radiation and a neutron source of predetermined intensity relative to the size of the gamma source. The instrument also includes a radiation detector sensitive to gamma radiation scattered in the borehole from the gamma source and to induce gamma radiations in the borehole resulting from the neutron source. The source is provided with a shield for preventing gamma radiation from passing directly from the source to the detector. Means are further provided for indicating a quantitative signal display proportional to the intensity of the radiation detected by the detector in correlation with the position in the borehole where the radiation is detected.

Preferably, means are provided for continuously urging one side of the instrument against the side of the borehole along the adjacent earth formations as the instrument is passed therethrough. In accordance with this embodiment of the invention, advantageously the source shield substantially encloses the source except for a collimated opening for directing gamma radiation from the source primarily away from the adjacent earth formations on the side of the instrument towards which the instrument is continuously urged and through the open borehole so that the radiation scattered from the source to the detector will be influenced primarily by changes in the size of the borehole rather than by variations in the material of which the adjacent formations are comprised. Preferably, shielding means are also provided along the side of the detector which is urged against the adjacent earth formation in order to minimize th influence of stray gamma radiation in the borehole along the adjacent earth formation.

For additional objects and advantages and for a better understanding of the invention, attention is now directed to the following description and accompanying drawings. The features of the invention which are believed to be novel are particularly pointed out in the appended claims.

In the drawings:

FIGURE 1 is a schematic representation showing a vertical elevation through a portion of a borehole traversing a plurality of earth formations and having a well logging instrument suspended therein and which instrument is constructed in accordance with principles of the invention;

FIGURE 2 illustrates a cross-sectional view through the lines 2—2 of the instrument shown in FIGURE 1;

FIGURE 3 illustrates a cross-sectional view through the lines 3—3 of the instrument shown in FIGURE 1; and FIGURE 4 illustrates a cross-sectional view through the lines 4—4 of the instrument shown in FIGURE 1.

Referring now to FIGURE 1 of the drawings there is shown a borehole 10 traversing a plurality of earth formations 11, 12, 13 and 14. The borehole 10 is shown containing a well fluid 15, such as water, crude oil, drilling fluid, or some combination of the foregoing, for example. Suspended within the borehole 10, as by means of a cable 16, there is shown a well logging instrument 17 constructed in accordance with principles of the invention for conducting a caliper log of the formations along the borehole. The cable 16 may include an outer conductive sheath which provides structural support for the instrument 17 and which, together wtih one or more additional inner insulated conductors (not individually shown) affords means for transmitting electrical power from the surface to the logging instrument and for transmitting electrical signal information between the logging instrument 17 and the surface equipment. The surface equipment provides means for transmitting operating power to the logging instrument (not specifically illustrated) and for receiving the signals transmitted from the logging instrument 17 and amplifying and segregating the received signals as necessary for recording purposes. In particular, the surface equipment includes apparatus designated as surface electronics 18 which may include a suitable amplifying device together with a pulse height equalization network and a ratemeter circuit for providing an output signal which varies as a function of the rate-of-occurrence of the penetrative radiation signal developed by the instrument 17 in the borehole 10 and transmitted to the surface over the cable 16. The output of the surface electronics 18 is shown coupled to a display device shown as a recorder 19 for providing a continuous record of the intensity of detected radiation. In order to correlate the position of the logging instrument 17 in the borehole 10 during the caliper well log there is provided at the surface a measuring apparatus represented diagrammatically as a wheel 20 having an output path 21 coupled to the recorder 19. Thus, the continuous caliper record on the recorder 19 may indicate both the caliper information and position of the logging instrument continuously in correlation.

The logging instrument 17 comprises an elongated outer shell-like housing or casing 25 formed conventionally of steel in accordance with known techniques to withstand the pressures and temperatures commonly encountered in the borehole well logging art. Advantageously, the housing 25 should be of such character as to withstand the conditions that may be found in boreholes of the order of 10,000 or 20,000 feet in depth.

The lower portion of the casing 25 of the instrument 17 is provided with a penetrative radiation source 26 which emits both gamma radiation and neutron radiation, as hereinafter described. Advantageously, the source 26 is positioned within a source chamber defined by a gamma radiation shield 27 which substantially surrounds the source 26 on all sides, except for an opening or collimated slot 28 for directing gamma radiation through the borehole to be calipered while minimizing the passage of gamma radiation into the adjacent earth formations. The shield 27 may advantageously be formed of high density material such as lead or tungsten or one of the improved gamma radiation shielding alloys such as that marketed as "Mallory 1000" metal. The source 26 may be advantageously in the form of a cylinder as shown so that it may be inserted in a cylindrical opening in the shield 27 as illustrated in the drawing and retained therein by means of a plug 29 of gamma radiation shielding material, which, in turn, is held in place by means of a threaded plug 30 in the lower end of the instrument housing 25. This arrangement permits the source to be readily inserted and removed from the instrument 17 to minimize the radiation health hazard when the instrument is not in use.

In accordance with novel aspects of the present invention, the source 26 emits not only gamma radiation for conducting the basic scattered gamma caliper well log, but it also emits a predetermined neutron flux for irradiating the borehole material along with the gamma radiation emitted by the source 26. The purpose of the predetermined neutron flux emitted by the source 26 is to provide for neutralization of the influence of the material of the borehole environment upon the caliper log conducted by means of the gamma radiation emitted by the source 26 and scattered to the detector. Gamma radiation from the source 26 will be influenced to some extent by the material of the borehole environment, especially the adjacent earth formations. Changes in this material from place to place along the borehole may provide a false indication of changes in borehole size as determined by the scattered gamma radiation log, per se. However, the neutrons emitted by the source 26 irradiate the same material as the gamma radiation from the source 26 and induce therein neutron-gamma radiation, the intensity of which varies inversely with those changes in the intensity of the scattered gamma radiation from the gamma source 26 which are due to change in the irradiated material along the borehole. By choosing a neutron component of appropriate size in relation to the gamma component to provide substantially the same change in neutron-induced gamma radiation flux in response to variations in borehole material as those variations in scattered gamma radiation flux due to the same changes in borehole material, but of opposite direction, i.e., so that the intensity of the neutron-induced gamma radiation increases while the intensity of the scattered gamma radiation decreases in response to changes in borehole material, it is possible to provide for substantial neutralization of the effect of such changes in borehole material in the resultant scattered gamma radiation caliper log. This may be accomplished by simultaneously detecting both the scattered gamma radiation as affected by both borehole size and formation material along with the neutron-induced gamma radiation which is affected by changes in borehole material so that the response of the neutron-induced gamma radiation and scattered gamma radiation due to changes in borehole material effectively neutralize one another. The result therefore is a scattered gamma radiation log substantially entirely responsive to changes in borehole size and which is effectively neutralized for changes in formation material. The source 26 may comprise a unitary capsule containing radium in combination with a predetermined quantity of beryllium so that it emits both gamma radiation and neutron radiation. The source 26 may also combine a separate gamma source such as radium or cobalt 60 and a separate neutron source such as radium D or polonium, for example.

Advantageously, as illustrated in the drawings, the source 26 may be offset from the vertical or elongated axis of the logging instrument away from the adjacent earth formations in order to afford maximum shielding between the source and adjacent earth formation from which stray gamma radiation is to be excluded. The collimated aperture 28 in the shield 27 is appropriately shaped for directing radiation towards the open hole side of the logging instrument and generally upwardly toward the gamma radiation detector 40 mounted within the housing above the shield 27.

The gamma radiation detector may be advantageously of the electrical pulse producing type, preferably of the high efficiency multiple cathode type, such as those shown and described in U.S. Letters Patent 2,397,071—D. G. C. Hare. However, it is also contemplated that the invention may be carried out through the use of a scintillation type detector which is sensitive to gamma radiation scattered from the source.

In order to minimize the influence of the adjacent earth formations upon the radiation scattered from the source 26 to the detector 40, a shield 41 is provided behind the detector 40 between the detector and the adjacent earth formation. The output of the detector 40 is coupled to electrical apparatus within the instrument 17 identified as instrument electronics 42 which may include an appropriate power source for the detector together with apparatus for amplifying the output of the detector 40 and transmitting the amplified output over the cable 16 to the surface electronics 18. It is to be understood that the instrument electronics 42 may include such other circuitry as may be necessary for proper operation of the detector 40 including a quench circuit if found desirable for the proper operation of the detector.

In order to urge the instrument 17 continuously against the adjacent earth formation throughout the caliper log there is provided a decentralizing bow spring 50 having its upper and lower ends 51 and 52 mounted to the logging instrument 17 in such manner that the spring 50 is free to flex as the instrument 17 is moved past irregularities in the side of the borehole during the caliper log. This may be accomplished by mounting the upper and lower ends of the bow spring 50 in slidably engageable relationship to the instrument 17, as by means of elongated slots (not shown) in the bow spring 50 which are mounted to studs on the instrument 17.

The side of the instrument 17 which is continuously urged against the adjacent earth formations may be referred to as the inactive side of the instrument 17. This inactive side may be provided with a rib-like member 60 for cutting through mud cake along the side of the instrument in order to assure that the instrument is maintained in generally fixed relation to the side of the borehole against which the instrument is urged throughout a caliper run.

As shown in FIGURE 2, the shield 41 around the rear of the detector 40 may advantageously extend around the sides of the instrument tapering toward the front or active side of the instrument (the left being considered the front as shown in the drawing) so that the shielding around the detector is primarily effective in directions facing the adjacent formation and tapers gradually in directions toward which the formation wall is further away from the detector.

As shown in FIGURE 3, the collimated aperture 28 may advantageously direct gamma radiation in a relatively confined beam which may be of the order of 45° as shown by the angle theta in FIGURE 3.

Preferably in accordance with the present invention, the cathode of the multiple-plate Geiger type radiation detector described above should be formed of higher atomic number material in order to emphasize the detection of gamma radiation scattered from the source. Preferred materials include tungsten and tantalum.

Advantageously in accordance with a preferred aspect of this invention, the distance S between the near end of the source 26 and near end of the detector 40 should be longer than in the case of the usual formation scattered gamma log in order to emphasize the effect of changes in size of the borehole rather than the variations in the material of the earth formations along the borehole. Although the linearity of the measurement of scattered borehole gamma radiation improves at longer source-to-detector spacings, nevertheless, the overall counting rate decreases at longer spacings. Using a counter having a length of six inches (6 inches) satisfactory caliper logs have been conducted at spacings S of 12 to 20 inches using a radium source of about 200 mg. The preferred range for linearity of response with apparatus thus described is 16 to 20 inches.

In accordance with a further embodiment of the present invention the radiation detector may be a scintillation type detector, rather than the high efficiency multiple-plate Geiger type detector described above. It is contemplated that the scintillation detector may comprise a gamma radiation sensitive thallium activated sodium iodide crystal in combination with an appropriate photomultiplier tube and pre-amplifier, all of which may be enclosed within a suitable heat insulating chamber such as a Dewar flask and provided with means for temperature stabilization. This may be accomplished through the use of a suitable refrigerant such as ice or by means of refrigeration techniques such as those shown and described in U.S. Letters Patent 2,824,233, granted February 18, 1958 to Gerhard Herzog. In the case of a scintillation type detector, the instrument electronics and surface electronics may be modified to accommodate such a detector and may include an appropriate pulse amplitude or signal discriminator in addition to a noise level discriminator which may be employed regardless of the type detector used.

The use of scintillation type detectors in carrying out the teachings of the present invention affords certain advantages as compared with other types of detectors, such as those of the Geiger-Mueller type. Scintillation type detectors ordinarily are higher efficiency detectors than the other type. The use of such higher efficiency detectors enables the use of shorter detectors, for example, one or two inches in length, than corresponding detectors which would be required to give a corresponding output signal. The shorter detectors provide better definition as compared with longer detectors. A further feature of the use of scintillation type detectors resides in the fact that they may be operated proportionally with the output signal being proportional to the energy of the detected radiation. By adjusting the bias of a proportional scintillation detector the relative amounts of gamma-gamma and neutron-gamma components may be varied in the resultant output signal. This type of bias adjustment may be advantageously carried out in accordance with a preferred aspect of this invention prior to conducting the caliper log in order to adjust the logging instrument so that the influence of formation material on the caliper log will be neutralized as herein described.

The scattered gamma radiation reaching the detector will have an energy range depending upon the character of the gamma radiation source used for the caliper log. Using a radium-beryllium source of neutrons of 200 mg. the gamma radiation scattered to the detector would have an average energy of .2 to .3 m.e.v. The most significant neutron-induced gamma radiation has an average energy of the order of 2.2 m.e.v. due to the capture of thermal neutrons by hydrogen. There is additional neutron-induced gamma radiation of interest, ordinarily of higher energy level than the 2.2 m.e.v. hydrogen gammas. These additional induced gamma radiations include those due to the capture of thermal neutrons by chlorine having energies of about 5–8 m.e.v. However, much of the aforesaid neutron-induced gamma radiation is degraded in energy by the time it reaches the detector to the extent that much of it has an energy corresponding to the natural gamma radiation in the borehole. The natural gamma radiation has an average energy of the order of 1.1 m.e.v. and may extend up to 2.62 m.e.v.

Since the natural gamma radiation and much of the neutron-induced gamma radiation overlap in energy levels it is ordinarily difficult to eliminate the detection of the natural gamma radiation present in the borehole from the detected signal of combined neutron-gamma and scattered gamma radiations, according to the present invention. The influence of the natural gamma radiation may be minimized by utilizing a sufficiently strong source of neutrons for the neutron-induced gamma radiation and a correspondingly intense source of gamma radiation for the scattered gamma radiation to override the natural gamma radiation that is detected.

Although tending to complicate the carrying out of the present invention, a pulse-height analyzer may be employed so that the output of an upper signal detection channel generally above the level of any significant natural gamma radiation may be combined with the output of a lower channel indicating scattered gamma radiation generally below most of the significant natural gamma radiation. By this technique gamma radiation having energies between the upper and lower channels, including natural gamma radiation in the region overlapped by degraded neutron-induced gamma radiation, may be eliminated from the resultant signal. However, it is simpler to employ a sufficiently intense source of both neutron and gamma radiations, as discussed above, in order to override the natural gamma radiation.

It is contemplated within the purview of the present invention that the scattered gamma radiation caliper apparatus herein described and claimed may be combined in the same logging instrument with other logging apparatus of the conventional type, such as a neutron-gamma radiation or gamma-gamma radiation formation logging instrument as described, for example, in the aforementioned patents of Alexander S. McKay and Gerhard Herzog.

Obviously, many modifications and variations of the invention, as hereinbefore set forth, may be made without departing from the spirit and scope thereof, and therefore only such limitations should be imposed as are indicated in the appended claims.

I claim:

1. Apparatus for conducting a penetrative radiation caliper well log comprising an instrument adapted to be passed through a borehole traversing a plurality of earth formations, said instrument comprising means primarily sensitive to variations in borehole size as compared with characteristics of the adjacent earth formations for calipering the borehole as a function of scattered gamma radiation, said calipering means including a source of gamma radiation for irradiating the borehole and a gamma radiation detector in the vicinity of said gamma radiation source for detecting a first gamma radiation component scattered in the borehole as the result of irradiation by said gamma radiation source, means including a gamma radiation shield for preventing gamma radiation from passing directly from said gamma radiation source to said detector, means for providing a signal display quantitatively indicating the intensity of the radiation detected by said detector in correlation with the position in the borehole where said radiation is detected and means for subjecting said detector to a predetermined flux of a second gamma radiation component, the intensity of which varies inversely in response to variations in the material of the borehole environment as compared to corresponding variations in the intensity of said detected scattered first gamma radiation component due to variations in the material of said borehole environment.

2. Apparatus as defined in claim 1 wherein said second gamma radiation component comprises neutron-gamma radiation and said means for subjecting said gamma detector to said second gamma radiation component comprises a source of neutron radiation for irradiating the borehole in the environment of the instrument subject to said gamma radiation in order to induce a predetermined flux of neutron-gamma radiation which varies according to variations in the irradiated material and which neutron-induced gamma radiation flux characteristically varies inversely with the flux of the scattered first gamma radiation component due to variations in the material of the environment of the borehole.

3. Apparatus for conducting a penetrative radiation caliper well log comprising an instrument adapted to be passed through a borehole traversing a plurality of earth formations, said instrument comprising means primarily sensitive to variations in borehole size as compared with characteristics of the adjacent earth formations for calipering the borehole as a function of scattered gamma radiation, said calipering means including a source of gamma radiation for irradiating the borehole and a gamma radiation detector in the vicinity of said gamma radiation source for detecting a first gamma radiation component scattered in the borehole as the result of irradiation by said gamma radiation source, means including a gamma radiation shield for preventing gamma radiation from passing directly from said gamma radiation source to said detector, said shield substantially enclosing said source except for a collimated opening for directing gamma radiation from said gamma source primarily away from the adjacent earth formations on one side of said instrument and through the material of the borehole in order to minimize the influence of the material of the adjacent earth formations on the gamma radiation reaching said detector from said source, means for shielding said detector from stray gamma radiation in the borehole on said one side of said instrument facing said adjacent earth formations, means for continuously urging said one side of said instrument against the side of the borehole along said adjacent earth formations as the instrument is passed therethrough, means for providing a signal display quantitatively indicating the intensity of the radiation detected by said detector in correlation with the position in the borehole where said radiation is detected and means for subjecting said detector to a predetermined flux of a second gamma radiation component, the intensity of which varies inversely in response to variations in the material of the borehole environment irradiated with said gamma radiation source as compared to corresponding variations in said detected scattered first gamma radiation component flux due to variations in the material of said borehole environment.

4. Apparatus as defined in claim 3 wherein said second gamma radiation component comprises neutron-gamma radiation and said means for subjecting said gamma detector to said second gamma radiation component comprises a source of neutron radiation for irradiating the borehole in the environment of the instrument subject to said gamma radiation in order to induce a predetermined flux of neutron-gamma radiation which varies according to variations in the irradiated material and which neutron-induced gamma radiation flux characteristically varies inversely with the flux of the scattered first gamma radiation component due to variations in the material of the environment of the borehole.

5. In the method of conducting a penetrative radiation caliper well log of a bore hole traversing earth formations wherein a selected penetrative radiation is emitted in the borehole and resultant gamma radiation scattered in the borehole is selectively detected to the exclusion of non-selected scattered gamma radiation primarily influenced by the earth formations surrounding the borehole and a signal display proportional to the intensity thereof is provided as an indication of the size of the borehole in correlation with the position of the measurement in the borehole, the improvement which comprises neutralizing of the influence of variations in the material of the environment of the borehole on the selected scattered radiation flux by emitting in the borehole a predetermined flux of another type of penetrative radiation which results in a secondary radiation flux the intensity of which characteristically varies inversely due to changes in material of the borehole environment as compared with variations in the intensity of the selected scattered radiation due to such changes in the borehole environment and detecting said resultant flux together with said scattered selected radiation in order to provide for neutralization of the influence of variations in the said material.

6. In the method of conducting a penetrative radiation caliper well log of a bore hole traversing earth formations wherein gamma radiation is emitted in the borehole and resultant gamma radiation scattered in the borehole is selectively detected to the substantial exclusion of non-selected scattered gamma radiation primarily influenced by the earth formations surrounding the borehole and a signal display proportional to the intensity thereof is provided as an indication of the size of the borehole in correlation with the position of the measurement in the borehole, the improvement which comprises neutralizing the influence of the environmental material of the borehole upon the selective scattered gamma radiation intensity measurement by simultaneously irradiating the borehole environmental material with neutrons of predetermined flux and detecting the resultant neutron induced gamma radiation along with the selected scattered gamma radiation so that the variations in the borehole environmental material affecting both the selected scattered gamma radiation intensity and the neutron-induced gamma radiation intensity will be effectively neutralized in the resultant selected scattered gamma radiation caliper well log.

7. The method of claim 6 wherein the resultant neutron induced gamma radiation due to neutron irradiation is of higher energy than the selected scattered gamma radiation, and wherein both said neutron induced and selected scattered gamma radiations are detected by the use of a gamma ray detector operated proportionally and characterized by the preliminary step of adjusting the bias on the proportional counter to vary the relative amounts of the higher energy neutron-induced gamma radiation and lower energy selected scattered gamma radiation detected by said detector.

References Cited in the file of this patent
UNITED STATES PATENTS

| | | |
|---|---|---|
| 2,644,891 | Herzog | July 7, 1953 |
| 2,648,778 | Silverman | Aug. 11, 1953 |
| 2,710,925 | McKay | June 14, 1955 |
| 2,749,446 | Herzog | June 5, 1956 |
| 2,934,652 | Caldwell et al. | Apr. 26, 1960 |
| 2,998,521 | Rankin | Aug. 29, 1961 |